(12) United States Patent
Agarwal et al.

(10) Patent No.: US 11,845,464 B2
(45) Date of Patent: Dec. 19, 2023

(54) DRIVER BEHAVIOR RISK ASSESSMENT AND PEDESTRIAN AWARENESS

(71) Applicant: Honda Motor Co., Ltd., Tokyo (JP)

(72) Inventors: Nakul Agarwal, Santa Clara, CA (US); Yi-Ting Chen, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 370 days.

(21) Appl. No.: 17/162,054

(22) Filed: Jan. 29, 2021

(65) Prior Publication Data

US 2022/0144303 A1    May 12, 2022

Related U.S. Application Data

(60) Provisional application No. 63/113,150, filed on Nov. 12, 2020.

(51) Int. Cl.
*B60W 60/00* (2020.01)
*B60W 40/09* (2012.01)
(Continued)

(52) U.S. Cl.
CPC .......... *B60W 60/001* (2020.02); *B60W 40/09* (2013.01); *G06N 3/049* (2013.01);
(Continued)

(58) Field of Classification Search
CPC .......... G06N 3/08; G06N 3/045; G06N 3/044; G06N 5/04; G06N 3/0464; G06F 18/241; G06F 18/213; G06F 18/25; G06F 21/36; G06F 8/34; G06T 2207/10016; G06T 2207/30248; G06T 2207/20072;
(Continued)

(56) References Cited

U.S. PATENT DOCUMENTS 11,205,082 B2 * 12/2021 Adeli-Mosabbeb ... G06V 10/82
2007/0043491 A1 * 2/2007 Goerick ................ G06V 20/58
701/41

FOREIGN PATENT DOCUMENTS

EP    2654028 A1 * 10/2013   .......... B60W 30/095

OTHER PUBLICATIONS

Diehl et al, Graph Neural Networks for Modelling Traffic Participant Interaction, 2019 IEEE Intelligent Vehicles Symposium (IV) Paris, France. Jun. 9-12, pp. 695-701 (Year: 2019).*

(Continued)

*Primary Examiner* — Nay A Maung
*Assistant Examiner* — Xiao Liu
(74) *Attorney, Agent, or Firm* — RANKIN, HILL & CLARK LLP (57) ABSTRACT

Driver behavior risk assessment and pedestrian awareness may include an receiving an input stream of images of an environment including one or more objects within the environment, estimating an intention of an ego vehicle based on the input stream of images and a temporal recurrent network (TRN), generating a scene representation based on the input stream of images and a graph neural network (GNN), generating a prediction of a situation based on the scene representation and the intention of the ego vehicle, and generating an influenced or non-influenced action determination based on the prediction of the situation and the scene representation.

18 Claims, 6 Drawing Sheets

(51) Int. Cl.

| | |
|---|---|
| *G06N 3/049* | (2023.01) |
| *G06N 3/08* | (2023.01) |
| *G06V 10/25* | (2022.01) |
| *G06V 20/56* | (2022.01) |

(52) U.S. Cl.
CPC ............... *G06N 3/08* (2013.01); *G06V 10/25* (2022.01); *G06V 20/56* (2022.01)

(58) Field of Classification Search
CPC ........ G06V 10/82; G06V 20/56; G06V 10/25; G06V 20/58; G06V 10/764; G06V 10/454; G06V 20/588; G06V 10/40; G06V 40/168; G06V 40/20; G06V 40/161; G06V 20/584; G06V 20/597; G06V 20/582; G06V 20/54; G06V 20/59; G06V 20/53; G06V 10/426; G06V 20/50; G06V 30/147; B60W 30/09; B60W 50/14; B60W 30/0956; B60W 40/09; B60W 10/20; B60W 30/095; B60W 2420/42; B60W 30/0953; B60W 40/08; B60W 2554/4029; B60W 30/18159; B60W 2520/04; B60W 60/0017; G08G 1/166; G08G 1/0125; G08G 1/095
See application file for complete search history.

(56) References Cited

OTHER PUBLICATIONS

Cao et al, Using Graph Convolutional Networks Skeleton Based Pedestrian Intention Estimation Models for Trajectory Prediction, Journal of Physics: Conference Series, vol. 1621, 2020 International Conference on Computer Science and Communication Technology (ICCSCT) (Year: 2020).*
Xu et al, Temporal Recurrent Networks for Online Action Detection, ICCV (Year: 2019).*
Kokubun et al, Quantitative assessment of driver's risk perception using a simulator, Int. J. Vehicle Safety, vol. I, Nos. 1/2/3 (Year: 2005).*
Jeon et al, SCALE-Net: Scalable Vehicle Trajectory Prediction Network under Random Number of Interacting Vehicles via Edge-enhanced Graph Convolutional Neural Network, 2020 IEEE/RSJ International Conference on Intelligent Robots and Systems (IROS) Oct. 25-29, 2020.*
He et al, Mask R-CNN, arXiv:1703.06870v3 24 (Year: 2018).*
Rasouli et al, PIE: A Large-Scale Dataset and Models for Pedestrian Intention Estimation and Trajectory Prediction, ICCV (Year: 2019).*
Khonji et al, A Risk-Aware Architecture for Autonomous Vehicle Operation Under Uncertainty, 2020 IEEE International Symposium on Safety, Security, and Rescue Robotics (SSRR), Nov. 4-6, Abu Dhabi, UAE, pp. 311-317 (Year: 2020).*
Gebert et al, End-to-end Prediction of Driver Intention using 3D Convolutional Neural Networks, 2019 IEEE Intelligent Vehicles Symposium (IV) Paris, France. Jun. 9-12, 2019.*
Yu et al, Scene-Graph Augmented Data-Driven Risk Assessment of Autonomous Vehicle Decisions, arXiv:2009.06435v1 31 Aug. 31, 2020.*
M. Kokubun, H. Konishi, K. Higuchi, T. Kurahasi and Y. Umemura. Quantative assessment of driver's risk perception using a simulator. Int. J. Verhicle Safety, vol. 1, Nos. 1/2/3, 2005.
Max Theo Schmidt, Ulrich Hofmann, and Mohamed Essayed Bouzouraa. A Novel Goal Oriented Concept for Situation Representation for ADAS and Automated Driving. In ITSC, 2014.
Ashish Tawari, Praneeta Mallela, and Sujitha Martin. Learning to Attend to Salient Targets in Driving Videos using Fully Convolutional RNN. In ITSC, 2018.
Alexandre Alahi, Kratarth Goel, Vignesh Ramanathan, Alexandre Robicquet, Li Fei-Fei, and Silvio Savarese. Social LSTM: Human Trajectory Prediction in Crowded Spaces. In CVPR, 2016.
Stefano Alletto, Andrea Palazzi, Franceco Solera, Simone Calderara, and Rita Cucchiara. DR(eye)VE: A Dataset for Attention-based Tasks with Applications to Autonomous and Assisted Driving. In CVPR-W, 2016.
Aniket Bera, Nico Galoppo, Dillon Sharlet, Adam Lake, and Dinesh Manocha. AdaPT: Real-time Adaptive Pedestrian Tracking for crowded scenes. In ICRA, 2014.
Philipp Bergmann, Tim Meinhardt, and Laura Leal-Taixe. Tracking without bells and whistles. In /CCV, 2019.
Sarah Bonnin, Thomas Weisswange, Franz Kummert, and Jen Schmudderich. Pedestrian Crossing Prediction using Multiple Context based Models. In ITSC, 2014.
Holger Caesar, Varun Bankiti, Alex H. Lang, Sourabh Vora, Venice Erin Liong, Qiang Xu, Anush Krishnan, Yu Pan, Giancarlo Baldan, Oscar Beijbom. nuScenes: A multimodal dataset for autonomous driving. In CVPR, 2020.
Yiping Chen, Jingkang Wang, Jonathan Li, Cewu Lu, Zhipeng Luo, Han Hue, and Cheng Wang. LiDAR-Video Driving Dataset: Learning Driving Policies Effectively. In CVPR, 2018.
Marius Cordts, Mohamed Omran, Sebastian Ramos, Timo Rehfeld, Markus Enzweiler, Rodrigo Benenson, Uwe Franke, Stefan Roth, Bernt Schiele. The Cityscapes Dataset for Semantic Urban Scene Understanding. In CVPR, 2016.
Navneet Dalal and Bill Triggs. Histograms of Oriented Gradients for Human Detection. In CVPR, 2005.
Pim de Haan, Dinesh Jayaraman, and Sergey Levine. Causal Confusion in Imitation Learning. In NeuIPS, 2019.
Jiankang Deng, Jia Guo, Yuxiang Zhou, Jinke Yu, Irene Kotsia, and Stefanos Zafeiriou. Retinaface: Single-stage Dense Face Localisation in the Wild. In CVPR, 2020.
Piotr Dollar, Christian Wojek, Bernt Schiele, and Pietro Perona. Pedestrian Detection: A Benchmark. In CVPR, 2009.
Mica R. Endsley and Daniel J. Garland (Eds.). Theoretical Underpinnings of Situation Awareness: A Critical Review. Situation Awareness Analysis and Measurement. Mahwah, NJ: Lawrence Erlbaum Associates. 2000.
Mingfei Gao, Ashish Tawari, and Sujitha Martin. Goal oriented Object Importance Estimation in On-road Driving Videos. In ICRA, 2019.
Mingfei Gao, Mingze Xu, Larry S Davis, Richard Socher, and Caiming Xiong. Startnet: Online detection of action start in untrimmed videos. In Proceedings of the IEEE International Conference on Computer Vision, pp. 5542-5551, 2019.
Andreas Geiger, Martin Lauer, Christian Wojek, Christoph Stiller, and Raquel Urtasun. 3D Traffic Scene Understanding from Movable Platforms. IEEE transactions on pattern analysis and machine intelligence, 36(5):1012-1025, 2013.
Andreas Geiger, Philip Lenz, and Raquel Urtasun. Are we ready for Autonomous Driving? The KITTI Vision Benchmark Suite. In CVPR, 2012.
Agrim Gupta, Justin Johnson, Li Fei-Fei, Silvio Savarese, and Alexandre Alahi. Social GAN: Socially Acceptable Trajectories with Generative Adversarial Networks. In CVPR, 2018.
Hidekatsu Hamaoka, Toru Hagiwara, Masahiro Tada, and Kazunori Munehiro. A Study on the Behavior of Pedestrians when Confirming Approach of Right/Left-turning Vehicle while Crossing a Crosswalk. In IV-W, 2013.
Kaiming He, Georgia Gkioxari, Piotr Dollár, and Ross Girshick. Mask r-cnn. In Proceedings of the IEEE international conference on computer vision, pp. 2961-2969, 2017.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Sepp Hochreiter and Jürgen Schmidhuber. Long short-term memory. Neural computation, 9(8):1735-1780, 1997.
Xinyu Huang, Xinjing Cheng, Qichuan Geng, Binbin Cao, Dingfu Zhou, Pend Wang, Yuangquing Lin, and Ruigang Yang. The ApolloScape Dataset for Autonomous Driving. In CVPR, 2018.

(56) References Cited

OTHER PUBLICATIONS

Jinkyu Kim and John Canny. Interpretable Learning for Self-driving Cars by Visualizing Causal Attention. In ICCV, 2017.
Jinkyu Kim, Teruhisa Misu, Yi-Ting Chen, Ashish Tawari, and John Canny. Grounding Human-to-Vehicle Advice for Self-driving Vehicles. In CVPR, 2019.
Thomas N Kipf and Max Welling. Semi-supervised classification with graph convolutional networks. arXiv preprint arXiv:1609.02907, 2016.
J. Kooij, N. Schneider, F. Flohr, and D. Gavrila. Context-based Pedestrian Path Prediction. In ECCV, 2014.
Stáphanie Lefévre, Dizan Vasquez, and Christian Laugier. A Survey on Motion Prediction and Risk Assessment for Intelligent Vehicles. ROBOMECH Journal, 1:1, 2014.
Chengxi Li, Stanley H. Chan, and Yi-Ting Chen. Who Make Drivers Stop? Towards Driver-centric Risk Assessment: Risk Object Identification via Causal Inference. In IROS, 2020.
Tsung-Yi Lin, Michale Maire, Serge Belongie, Lubomir Bourdev, Ross Girshick, James Hays, Pietro Perona, Deva Ramanan, C. Lawrence Zitnick, Piotr Dollár. Microsoft COCO: Common Objects in Context. CVPR, 2015. arXiv:1405.0312v3, Feb. 21, 2015.
Bingbin Liu, Ehsan Adeli, Zhangjie Cao, Kuan-Hui Lee, Abhijeet Shenoi, Adrien Gaidon, and Juan Carlos Niebles. Spatiotemporal Relationship Reasoning for Pedestrian Intent Prediction. In ICRA, 2020.
Guilin Liu, Fitsum A Reda, Kevin J Shih, Ting-Chun Wang, Andrew Tao, and Bryan Catanzaro. Image inpainting for irregular holes using partial convolutions. In Proceedings of the European Conference on Computer Vision (ECCV), pp. 85-100, 2018.
Yan Luo, Chongyang Zhang, Muming Zhao, Hao Zhou, and Jun Sun. Where, What, Whether: Multi-modal Learning Meets Pedestrian Detection. In CVPR, 2020.
Srikanth Malla, Behzad Dariush, and Chiho Choi. TITAN: Future Forecast using Action Priors. In CVPR, 2020.
Anton Milan, Laura Leal-Taixe, Ian Reid, Stefan Roth, and Konrad Schindler. MOT16: A Benchmark for Multi-Object Tracking. In arXiv:1603.00831, 2016.
Athma Narayanan, Isht Dwivedi, Behzad Dariush. Dynamic Traffic Scene Classification with Space-Time Coherence. In CVPR, 2019. xrXiv:1905.12708v1, May 29, 2019.
Andrea Palazzi, Davide Abati, Francesco Solera, Rita Cucchiara, et al. Predicting the Driver's Focus of Attention: the DR(eye)VE Project. IEEE transactions on pattern analysis and machine intelligence, 41(7):1720-1733, 2018.
Adam Paszke, Sam Gross, Soumith Chintala, Gregory Chanan, Edward Yang, Zachary DeVito, Zeming Lin, Alban Desmaison, Luca Antiga, Adam Lerer. Automatic differentiation in PyTorch. In NIPS 2017 Workshop Autodiff, Oct. 28, 2017.
Abhishek Patil, Srikanth Malla, Haiming Gang, and Yi-Ting Chen. The H3D Dataset for Full-Surround 3D Multi-Object Detection and Tracking in Crowded Urban Scenes. In CVPR, 2019. arXiv:1903.01568v1, Mar. 4, 2019.
Vasanth Philomin, Ramani Duraiswami, and Larry Davis. Pedestrian Tracking from a Moving Vehicle. In IV, 2000.
Lorenzo Porzi, Samuel Rota Bulò, Aleksander Colovic, Peter Kontschieder. Seamless Scent Segmentation. In CVPR, 2019.
Vasili Ramanishka, Yi-Ting Chen, Teruhisa Misu, and Kate Saenko. Toward Driving Scene Understanding: A Dataset for Learning Driver Behavior and Causal Reasoning. In CVPR, 2018.
Amir Rasouli, Iuliia Kotseruba, Toni Kunic, and John K Tsotsos. PIE: A Large-scale Dataset and Models for Pedestrian Intention Estimation and Trajectory Prediction. In ICCV, 2019.
Amir Rasouli, Iuliia Kotseruba, and John K. Tsotsos. Are They Going to Cross? A Benchmark Dataset and Baseline for Pedestrian Crosswalk Behavior. In ICCV-W, 2017.
Amir Rasouli, Iuliia Kotseruba, and John K. Tsotsos. Pedestrian Action Anticipation using Contextual Feature Fusion in Stacked RNNs. In BMVC, 2018.
Amir Rasouli and John K Tsotso. Autonomous Vehicles that Interact with Pedestrians: A Survey of Theory and Practice. IEEE Transactions on Intelligent Transportation Systems, 21(3):900-918, 2020.
Seyed Hamid Rezatofighi, Anton Milan, Zhen Zhang, Qinfeng Shi, Anthony Dick, and Ian Reid. Joint Probabilistic Data Association Revisited. In ICCV, 2015.
Nicolas Schneider and Dariu Gavrila. Pedestrian Path Prediction with Recursive Bayesian Filters: A Comparative Study. In GCPR, 2013.
Pei Sun, Henrik Kretzschmar, Xerxes Dotiwalla, Aurélien Chouard, Vijaysai Patnaik, Paul Tsui, James Guo, Yin Zhou, Yuning Chai, Benjamin Caine, Vijay Vasudevan, Wei Han, Jiquan Ngiam, Hang Zhao, Aleksei Timofeev, Scott Ettinger, Maxim Krivokon, Amy Gao, Aditya Joshi, Sheng Zhao, Shuyang Cheng, Yu Zhang, Jonathon Shlens, Zhifeng Chen, and Dragomir Anguelov. Scalability in Perception for Autonomous Driving: Waymo Open Dataset. In CVPR, 2020. arXiv:1912.04838v7, May 12, 2020.
B. Tatler, M. Hayhoe, M. Land, and D. Ballard. Eye Guidance in Natural Vision: Reinterpreting Salience. Journal of Vision, 11:5, 2011.
Dequan Wang, Coline Devin, Qi-Zhi Cai, Fisher Yu, and Trevor Darrell. Deep object-centric Policies for Autonomous Driving. In ICRA, 2019.
Liming Wang, Jianbo Shi, Gang Song, and I fan Shen. Object Detection Combining Recognition and Segmentation. In ACCV, 2005.
Wenshuo Wang, Junqiang Xi, and Huiyan Chen. Modeling and recognizing driver behavior based on driving data: A survey. Mathematical Problems in Engineering, 2014.
Xinlong Wang, Tete Xiao, Yuning Jiang, Shuai Shao, Jian Sun, and Chunhua Shen. Repulsion Loss: Detecting Pedestrians in a Crowd. In CVPR, 2018.
Nicolai Wojke and Alex Bewley. Deep Cosine Metric Learning for Person Re-identification. In WACV, 2018.
Nicolai Wojke, Alex Bewley, and Dietrich Paulus. Simple online and realtime tracking with a deep association metric. In 2017 IEEE international conference on image processing (ICIP), pp. 3645-3649. IEEE, 2017.
World Health Organization. Global Status Report on Road Safety 2018: Summary, 2018.
Ye Xia, Danqing Zhang, Jinkyu Kim, and David Whitney Ken Nakayama, Karl Zipser. Predicting Driver Attention in Critical Situations. In ACCV, 2018.
Mingze Xu, Mingfei Gao, Yi-Ting Chen, Lary S. Davis, David J. Crandall. Temporal Recurrent Networks for Online Action Detection. In ICCV, 2019.
Shuo Yang, Ping Luo, Chen Change Loy, Xiaoou Tang. WIDER FACE: A Face Detection Benchmark. In CVPR, 2016.
Senthil Yogamani, Ciarán Hughes, Jonathan Horgan, Ganesh Sistu, Padraig Varley, Derek O'Dea, Michal Uřičář, Stefan Milz, Martin Simon, Karl Amende, Christian Witt, Hazem Rashed, Sumanth Chennupati, Sanjaya Nayak, Saquib Mansoor, Xavier Perrotton, Patrick Peréz. WoodScape: A multi-task, multi-camera fisheye dataset for autonomous driving. In ICCV, 2019.
Fisher Yu, Haofend Chen, Xin Wang, Wenqui Xian, Yingying Chen, Fangchen Liu, Vashisht Madhavan, Trevor Darrell. BDD100K: A Diverse Driving Dataset for Heterogenous Multitask Learning. In CVPR, 2020. arXiv:1805.046872v2, Apr. 8, 2020.
Kuo-Hao Zeng, Shih-Han Chou, Fu-Hsiang Chan, Juan Carlos Niebles, and Min Sun. Agent-Centric Risk Assessment: Accident Anticipation and Risky Region Localization. In CVPR, 2017.
Shanshan Zhang, Rodrigo Benenson, and Bernt Schiele. Filtered Channel Features for Pedestrian Detection. In CVPR, 2015.
Shanshan Zhang, Rodrigo Benenson, and Bernt Schiele. CityPersons: A Diverse Dataset for Pedestrian Detection. In CVPR, 2017.
Shifeng Zhang, Longyin Wen, Xiao Bian, Zhen Lei, and Stan Z. Li. Occlusion-aware R-CNN: Detecting Pedestrians in a Crowd. In ECCV, 2018.
Zehua Zhang, Chen Yu, David Crandall. A Self Validation Network for Object-Level Human Attention Estimation. 33rd Conference on Neural Information Processing Systems (NeurIPS 2019), Vancouver, Canada.

(56) References Cited

OTHER PUBLICATIONS

Zehua Zhang, Ashish Tawari, Sujitha Martin, and David Crandall. Interaction Graphs for Object Importance Estimation in On-road Driving Videos. ICRA, 2020.

* cited by examiner

DRIVER BEHAVIOR RISK ASSESSMENT AND PEDESTRIAN AWARENESS

CROSS-REFERENCE TO RELATED APPLICATIONS

This application claims the benefit of U.S. Provisional Patent Application, Ser. No. 63/113,150, filed on Nov. 12, 2020; the entirety of the above-noted application is incorporated by reference herein.

BACKGROUND

Modeling driver behavior is still an open research problem. Driver behavior may be complicated as it involves low-level operational controlling (e.g., vehicle velocity/acceleration, throttle/brake position, and lateral acceleration) and high level cognitive processing (e.g., the prediction of driving maneuvers, driver intent and state, traffic participants' intention, and environmental factors). At the cognitive level, the driver may first identify relevant elements that impact their navigation in the scene. Second, the driver may reason about the interconnections between these elements, and third, the driver may infer the future actions of the traffic participants. Modeling such a thought process has proven challenging because a driver's perception of risk is a complex cognitive process that is largely manifested by the voluntary response of the driver to external stimuli as well as the apparent attentiveness of participants toward the ego-vehicle.

BRIEF DESCRIPTION

According to one aspect, a system for driver behavior risk assessment and pedestrian awareness may include an image sensor receiving an input stream of images of an environment including one or more objects within the environment, an intention estimator estimating an intention of an ego vehicle based on the input stream of images and a temporal recurrent network (TRN), a scene representation generator generating a scene representation based on the input stream of images and a graph neural network (GNN), a situation predictor generating a prediction of a situation based on the scene representation and the intention of the ego vehicle, and a driver response determiner generating an influenced or non-influenced action determination based on the prediction of the situation and the scene representation.

The intention of the ego vehicle may be estimated as a left-turn intention, a right-turn intention, or a straight-travel intention. The environment may include a straight topology, a three-way intersection topology, or a four-way intersection topology. The situation may include a stop sign, a traffic light, a crossing pedestrian, a crossing vehicle, a vehicle blocking ego lane, a congestion, a jaywalking, a vehicle backing into parking space, a vehicle on shoulder open door, or a cut-in. The system for driver behavior risk assessment and pedestrian awareness may include a risk object identifier (ROI) extracting image-level and object-level features from the input stream of images of the environment. The ROI may determine one or more object bounding boxes for one or more of the objects within the environment. One or more of the object bounding boxes may be around a face or a head of a pedestrian and the ROI determines whether the pedestrian is looking or is not looking at the ego vehicle. The situation predictor may generate the prediction of the situation based on an element-wise dot product of the scene representation and the intention of the ego vehicle. The driver response determiner may generate the influenced or non-influenced action determination based on passing the prediction of the situation through a multilayer perceptron (MLP) and the scene representation. The situation predictor may classify the prediction of the situation into a binary class.

According to one aspect, a method for driver behavior risk assessment and pedestrian awareness may include receiving an input stream of images of an environment including one or more objects within the environment, estimating an intention of an ego vehicle based on the input stream of images and a temporal recurrent network (TRN), generating a scene representation based on the input stream of images and a graph neural network (GNN), generating a prediction of a situation based on the scene representation and the intention of the ego vehicle, and generating an influenced or non-influenced action determination based on the prediction of the situation and the scene representation.

The intention of the ego vehicle may be estimated as a left-turn intention, a right-turn intention, or a straight-travel intention. The environment may include a straight topology, a three-way intersection topology, or a four-way intersection topology. The situation may include a stop sign, a traffic light, a crossing pedestrian, a crossing vehicle, a vehicle blocking ego lane, a congestion, a jaywalking, a vehicle backing into parking space, a vehicle on shoulder open door, or a cut-in. The method for driver behavior risk assessment and pedestrian awareness may include extracting image-level and object-level features from the input stream of images of the environment.

The method for driver behavior risk assessment and pedestrian awareness may include determining one or more object bounding boxes for one or more of the objects within the environment. The method for driver behavior risk assessment and pedestrian awareness may include determining whether a pedestrian is looking or is not looking at the ego vehicle, and one or more of the object bounding boxes may be around a face or a head of the pedestrian. The method for driver behavior risk assessment and pedestrian awareness may include generating the prediction of the situation based on an element-wise dot product of the scene representation and the intention of the ego vehicle. The method for driver behavior risk assessment and pedestrian awareness may include generating the influenced or non-influenced action determination based on passing the prediction of the situation through a multilayer perceptron (MLP) and the scene representation.

A driver behavior risk assessment and pedestrian awareness vehicle may include an image sensor receiving an input stream of images of an environment including one or more objects within the environment, an intention estimator estimating an intention of the vehicle based on the input stream of images and a temporal recurrent network (TRN), a scene representation generator generating a scene representation based on the input stream of images and a graph neural network (GNN), a situation predictor generating a prediction of a situation based on the scene representation and the intention of the vehicle, and a driver response determiner generating an influenced or non-influenced action determination based on the prediction of the situation and the scene representation.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

The present disclosure relates to risk assessment and pedestrian awareness towards driver behavior understanding. Risk may be formulated from a driver-centric perspective to identify road agents that influence the driver in risky situations. A data set having annotations of driver intention (e.g., go straight), scenarios (e.g., a jay-walker is crossing the street), decision of driver maneuver (e.g., slow down), road topology of the scene (e.g., a 4-way intersection) and pedestrian awareness (e.g., looking or not looking) using face annotations when pedestrians are present is provided. These additional road topologies may be coupled with ego car interactions. Annotations may also include yields or original maneuvers. For risk assessment, a risk object identification framework is provided that explicitly models the causal relationship of driver intention, scenario, and decision of driver maneuver.

The scenario, ego-intention, and stimulus may be considered when relationships are formed. In one example, and when an ego vehicle approaches an intersection, an ego intention may be fixed, what obstacles are in the path, and what influences from traffic agents are defined. From this, risk objects may be understood and a "Stop" or "Go" may be determined.

Risk objects may be considered as a cause and effect problem. Given a sequence of video frames observed in the past, the model may first parse each frame into objects of interest, each of which is encoded to a feature vector. An egocentric spatiotemporal graph may be constructed using these features as node representations to produce a feature vector that encodes both scene context and the temporal history in the observed frame. A framework that explicitly models the causal relationship between the driver intention, scenario, and decision of driver maneuver is provided herein. The system for driver behavior risk assessment and pedestrian awareness may examine the problem of risk perception and introduce a new dataset to facilitate research in this domain. The dataset may include short video clips or image sequences that include annotations of driver intent, road network topology, situation (e.g., crossing pedestrian), driver response, and pedestrian attentiveness using face annotations and facial bounding boxes. With the dataset, the system may introduce a novel risk object identification (ROI) framework that models the causal relationship of driver intention, situation, and driver's response, thereby enabling causal influence (e.g., cause of driver response or reaction (i.e., one of the traffic participants, one or the environment features, etc.)) to be determined.

For pedestrian attentiveness, the system may provide both insight from both classification and detection perspectives. According to one aspect, driver behavior risk assessment and pedestrian awareness may utilize a large scale dataset with pedestrian face annotations in the driving scene to gauge pedestrian attentiveness within the context of risk perception and to provide a detection framework using faces of the pedestrians.

In this regard, advantages or benefits of the driver behavior risk assessment and pedestrian awareness described herein may include addressing the limitations of existing datasets by introducing a novel and comprehensive dataset with a diverse set of situations and annotations to enable research for risk object identification. Additionally, a framework for risk object identification may be provided which models the relationship between driver intention (e.g., where does the driver wish to go?), situation (e.g., reasoning, surroundings, position of traffic participants, directions traffic participants are moving, interaction between ego-vehicle and traffic participants, influence based on other traffic participants, etc.), and the driver response (e.g., continue, stop, slow, turn, etc.). Further, the system may provide annotations for pedestrian attentiveness on a subset of the proposed dataset to enable risk object identification, and provide a framework for pedestrian attention detection using faces.

According to one aspect, the dataset may include an image sequence or stream of images captured from video cameras, which may include LiDAR sensors and/or GPS sensors. Additionally, vehicle Controller Area Network (CAN) data may be collected for analyzing how drivers manipulate steering, breaking, and throttle in conjunction with the image sequence or stream of images. This sensor data may be synchronized and timestamped. Further, the data may captures a diverse set of traffic scenes including different traffic environments such as urban, suburban, and highway environments, for example. Pedestrian awareness data may be focused on intersection scenarios where diverse interactions between drivers and pedestrians are present.

The system for driver behavior risk assessment and pedestrian awareness may be utilized to develop robust intelligent driving systems which may be implemented using one or more vehicle systems, as described above (e.g., an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices, camera systems, proximity sensor systems, a climate control system, an electronic pretensioning system, a monitoring system, a passenger detection system, a vehicle suspension system, a vehicle seat configuration system, a vehicle cabin lighting system, an audio system, a sensory system, among others), such as by, for example, implementing one or more of the aforementioned vehicle systems based on the driver behavior risk assessment and pedestrian awareness or risk score, etc.

The dataset may include data which is categorized or manually categorized, and include a driver intention, a road topology, a situation, a decision of a driver, and a pedestrian awareness for each clip of data. According to one aspect, automatic situation localization in untrimmed videos may be explored using the proposed dataset.

Figure 1:
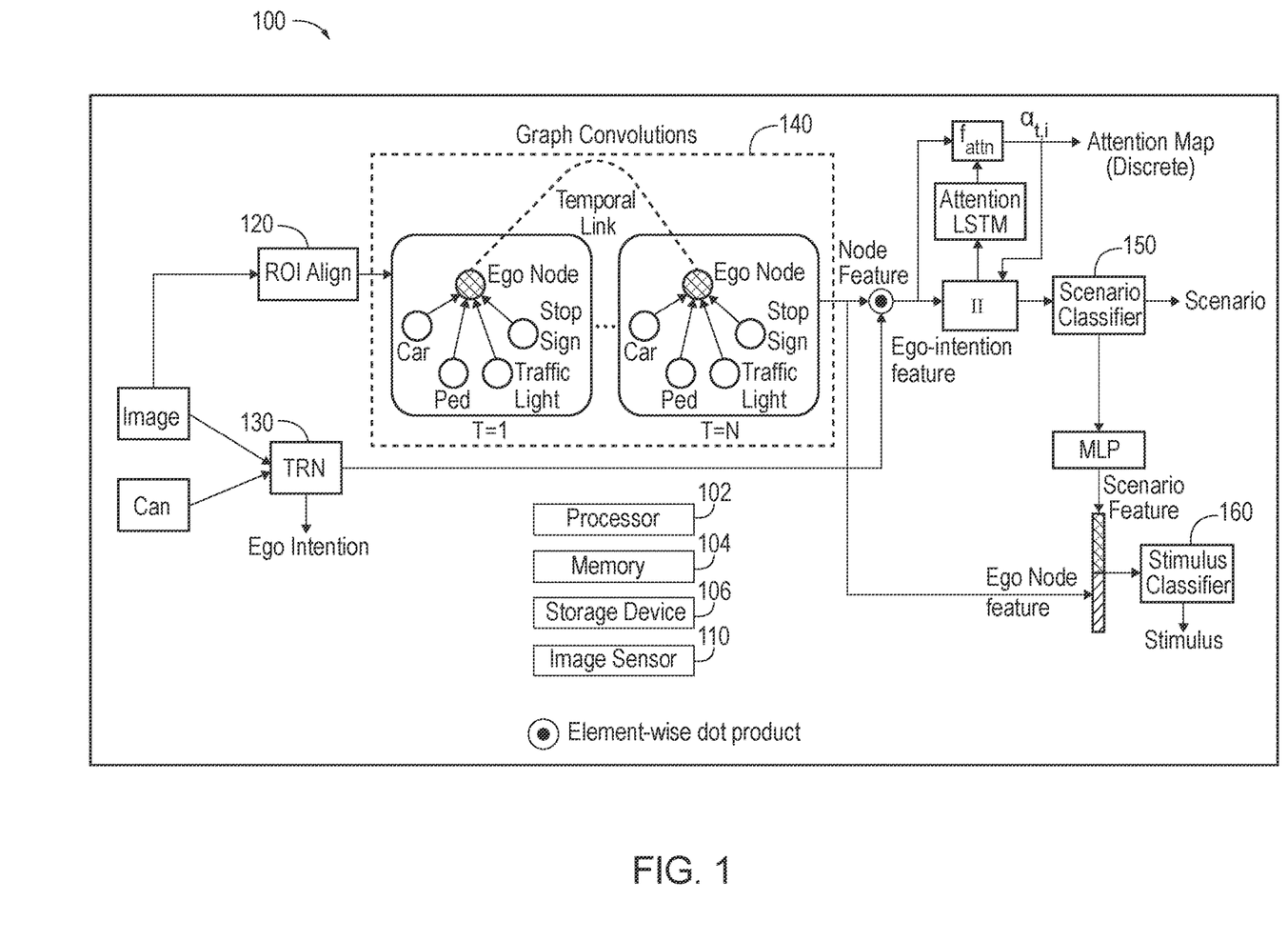
FIG. 1 is an exemplary component diagram of a system for driver behavior risk assessment and pedestrian awareness, according to one aspect.

FIG. 1 is an exemplary component diagram of a system 100 for driver behavior risk assessment and pedestrian awareness, according to one aspect. The system 100 may implement a four-layer representation, (i.e., driver intention, topology, situation, driver's response), to describe driver behavior for risk assessment. Specifically, the labeling structure may be designed for risk assessment. According to one aspect, intention of the ego vehicle or the driver intention may be estimated as a left-turn intention, a right-turn intention, or a straight-travel intention. Therefore, the system 100 for driver behavior risk assessment and pedestrian awareness as described herein does not require forecasting of any trajectories of any vehicles, pedestrians, traffic participants, etc. because the risk assessment is calculated instead. In this way, no trajectory forecasting is required whatsoever and modeling of the relationship between intentions, situation, and driver response may be provided. This explicit modeling facilitates identification of who may be an influence on the driver's behavior and who may be determined as risky or riskier as a traffic participant.

Drivers may be perceptive of the road topology and situation of scene as part of their planning and decision making. In this regard, the underlying road topology network may be annotated in a topology layer including a straight topology, a three-way intersection topology, or a four-way intersection topology.

While navigating toward a goal (e.g., reach an intersection) via a road topology network, a driver or an ego-vehicle may encounter different driving situations or react to certain road users or traffic participants (e.g., a bicyclist is crossing the street, a truck parked near the ego-lane, etc.). In this regard, a road user that directly impacts driver behavior may be annotated in a situation layer within the dataset. Examples of different types of situations may include a stop sign, a traffic light, a crossing pedestrian, a crossing vehicle, a vehicle blocking ego lane, a congestion, a jaywalking, a vehicle backing into parking space, a vehicle on shoulder open door, or a cut-in, etc.

The response of driver to the road users may be labeled in the driver's response layer of the dataset. According to one aspect, two types of decisions are annotated (i.e., influenced and non-influenced). Examples of influenced may include deviating from parked vehicle, yielding to crossing pedestrian, or stopping for stop sign, etc.

With regard to pedestrian attentiveness, the dataset may focus on annotations relating to the attention of pedestrians while the ego-vehicle is approaching (e.g., within a threshold distance, etc.). In other words, for the pedestrian attentiveness, the system 100 may select a subset of scenes from the dataset used for the risk object identification, so the subset includes scenes that the driver is influenced by pedestrians. Further, the pedestrian attentiveness portion of the dataset may include pedestrian attentiveness labels, (i.e., looking, not looking, and not sure) and may further include mutual awareness labels relating to driver monitoring and gaze information (e.g., whether the driver and the pedestrian and likely to be aware of one another). Further, pedestrian attentiveness portion of the dataset may include labels or bounding boxes and occlusion flags around pedestrian faces as well as pedestrian bodies. Therefore, the dataset enables reasoning or inferences associated with pedestrian attentiveness to be made from both faces and bodies instead of purely using body poses. According to one aspect, pedestrians may be considered if the pedestrian has a height greater than a threshold number of pixels for the pedestrian. Similarly, the pedestrian face may be considered if the facial bounding box is greater than a threshold number of pixels for the face. Occlusion flags (e.g., partially occluded, fully occluded, non-occluded, etc.) may be set for facial bounding boxes, pedestrian body bounding boxes, and/or pedestrian bounding boxes.

Figure 2:
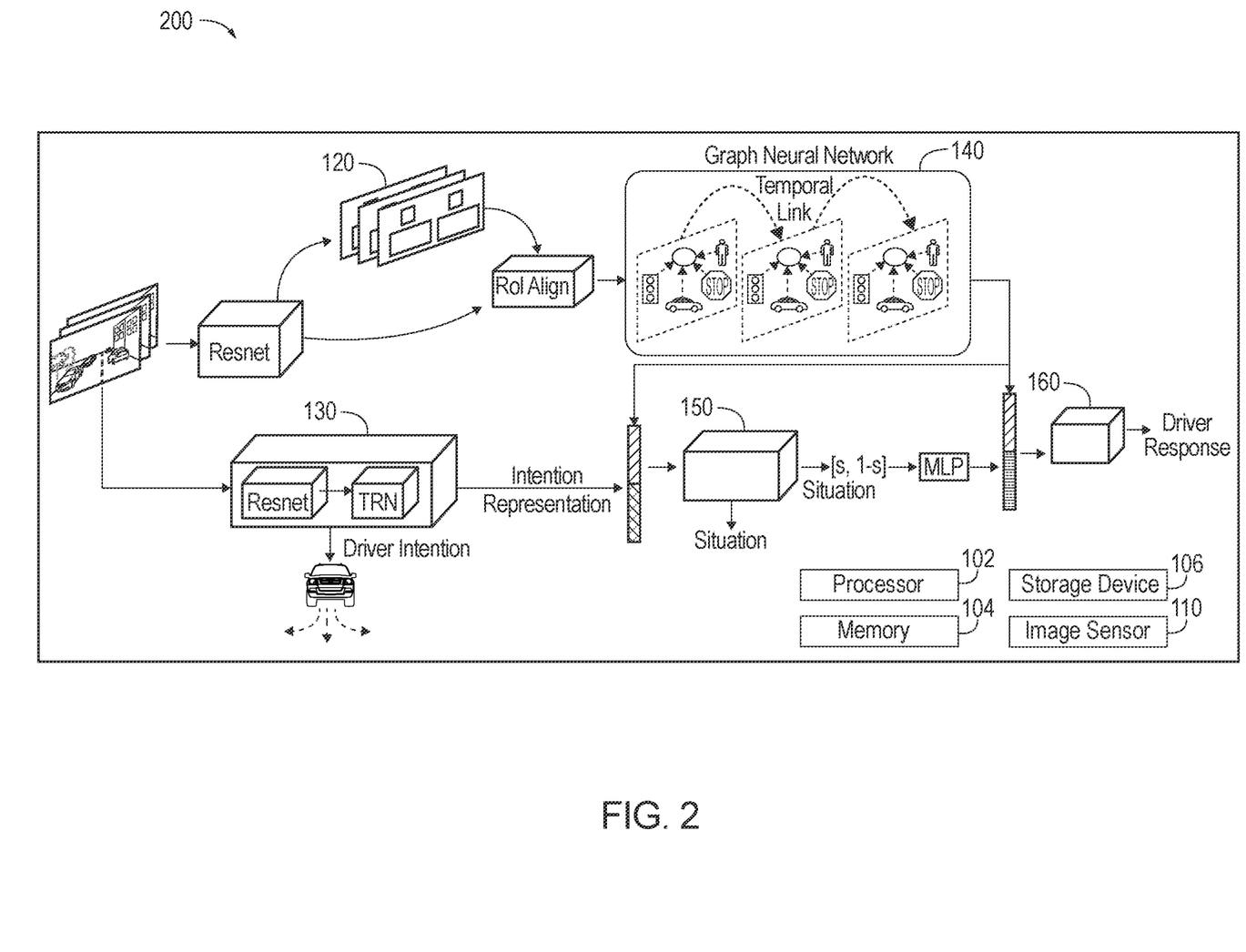
FIG. 2 is an exemplary component diagram of a system for driver behavior risk assessment and pedestrian awareness, according to one aspect.

According to one aspect, the system 100 may be setup to formulate the risk object identification problem as a cause and effect problem according to the framework or architecture of FIG. 1 or the framework or architecture of FIG. 2. FIG. 2 is an exemplary component diagram of a system 200 for driver behavior risk assessment and pedestrian awareness, according to one aspect.

In this regard, the system 100 for driver behavior risk assessment and pedestrian awareness of FIG. 1 and/or the system 200 for driver behavior risk assessment and pedestrian awareness of FIG. 2 may include a processor 102, a memory 104, a storage device 106 and/or database, an image sensor 110, a risk object identifier (ROI) 120, an intention estimator 130, a scene representation generator 140, a situation predictor 150, a driver response determiner 160, one or more buses interconnecting respective components. One or more of the ROI 120, the intention estimator 130, the scene representation generator 140, the situation predictor 150, or the driver response determiner 160 may be implemented via the processor 102, the memory 104, and/or the storage device 106. Further, the annotated dataset described above may be stored on the database or the storage device 106 or may be stored in a remote third party server. In any event, the annotated dataset may be utilized to train one or more of the ROI 120, the intention estimator 130, the scene representation generator 140, the situation predictor 150, or the driver response determiner 160.

The image sensor 110 may be an image capture device, such as a video camera, and may receiving an input stream of images of an environment including one or more objects (e.g., pedestrians, road users, etc.) within the environment.

According to one aspect, node features may be obtained using a Mask R-CNN pre-trained on a dataset (e.g., COCO dataset) and DeepSORT may be applied to detect and track respective objects. To identify object influencing driver behavior from an ego-centric view, the system 100 may construct an ego-centric spatio-temporal graph that models how road users influence the ego-vehicle using graph based reasoning. In this way, a compositional framework may be provided to determine whether the driver is influenced.

The ROI 120 may extract image-level and/or object-level features from the input stream of images of the environment. The ROI 120 may determine one or more object bounding boxes for one or more of the objects within the environment. One or more of the object bounding boxes may be around a face or a head of a pedestrian and the ROI 120 may determine whether the pedestrian is looking or is not looking at the ego vehicle. In this way, given a sequence of video frames observed, the framework of the system 100 of FIG. 1 or the system 200 of FIG. 2 may extract image-level and object-level features for objects of interest.

According to one aspect, RoIAlign may be used to extract the corresponding object-level representation. The ego node feature, (i.e. representation of the ego-vehicle), may be obtained similarly using a frame size bounding box. This also enables the capture of the scene context. Driving scenes are complicated, and not all objects in the scene influence the driver. Therefore, the system 100 or 200 may limit the objects of interest to the following classes: person, bicycle, car, motorcycle, bus, truck, traffic light, and stop sign. Additionally, the system 100 or 200 may use one or more partial convolution layers to simulate a situation without the presence of an object.

The intention estimator 130 may estimate an intention of an ego vehicle based on the input stream of images and a temporal recurrent network (TRN). The scene representation generator 140 may generate a scene representation based on the input stream of images and a graph neural network (GNN). Additionally, the scene representation generator 140 may construct an ego-centric spatio-temporal graph using extracted image-level and object-level features from the objects of interest as the representation of the various nodes in the graph. The system 100 or 200 may utilize scene representation to highlight the effect of modeling causal relationship between the driver intention, situation, and decision of driver maneuver. By connecting objects to the GNN, this enables the scene representation generator 140 to model the relationship between relevant traffic participants or features of the environment (e.g., stop signs, traffic lights, etc.), and thus, model the situation. Explained another way, the scene representation generator 140 may model the relationship of multiple other traffic participants and environment features with respect to the ego-vehicle over a series of timestamps, based on the GNN and the TRN. In this way, the system 100 or 200 may use causal influence to remove or mask an object or a feature from the images.

Specifically, once the node features are extracted, the system 100 or 200 may model interactions between the ego and objects via a message passing mechanism. To incorporate the temporal history in communication within the graph, the system 100 or 200 may model the ego and objects' temporal dynamics using a LSTM module or the scene representation generator 140.

The situation predictor 150 may generate a prediction of a situation based on the scene representation and the intention of the ego vehicle. According to one aspect, the situation predictor 150 may generate the prediction of the situation based on an element-wise dot product of the scene representation and the intention of the ego vehicle. The situation predictor 150 may classify the prediction of the situation into a binary class. To identify object influencing driver behavior from an ego-centric view, the scene representation generator 140 of the system 100 or 200 may construct an ego-centric spatio-temporal graph that models how road users influence the ego-vehicle using graph based reasoning.

The driver response determiner 160 may generate an influenced or non-influenced action determination based on the prediction of the situation and the scene representation and a risk score for one or more of the objects, traffic participants, or environment features based on the influenced or non-influenced action determination, the prediction of the situation, and/or the scene representation. According to one aspect, the driver response determiner 160 may generate the influenced or non-influenced action determination based on passing the prediction of the situation through a multilayer perceptron (MLP) and the scene representation.

In this way, the system 100 of FIG. 1 or the system 200 of FIG. 2 may model the causal relationship between the driver intention, situation, and decision of driver maneuver. The network architecture or system 100 or 200 may take as input, a sequence of RGB frames, a sequence of binary masks for partial convolution, and a set of object tracklets. These inputs may be passed on to the graph neural network (GNN) and TRN for obtaining the scene representation and the driver intention representation, respectively, which may be further concatenated to predict the situation. The logits from the situation classifier may further be categorized into binary classes, situation (s) and background (1−s) and may be passed through an MLP to obtain a refined representation, which may be concatenated with the graph based scene representation to predict the driver decision and determined to be either Influenced or Non-influenced.

Figure 3:
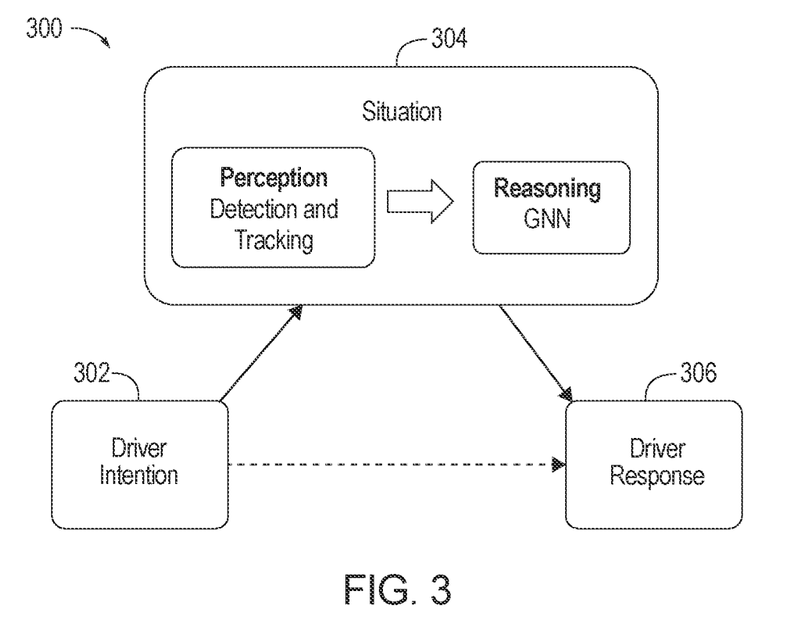
FIG. 3 is an exemplary diagram of factors associated with driver behavior risk assessment and pedestrian awareness, according to one aspect.

FIG. 3 is an exemplary diagram of factors associated with driver behavior risk assessment and pedestrian awareness, according to one aspect. According to one aspect, the system 100 or 200 may be modeled based on the causal relationship shown in FIG. 3, including the driver intention 302, the situation 304, and the driver response 306. It may be noted that the driver intention does not necessarily directly affect the decision of the driver (e.g., driver decision), as the driver may alter the course based on the traffic agent, (i.e. situation), irrespective of what the driver intention may be. However, the driver intention may indirectly affect the driver decision through the situation.

Figure 4:
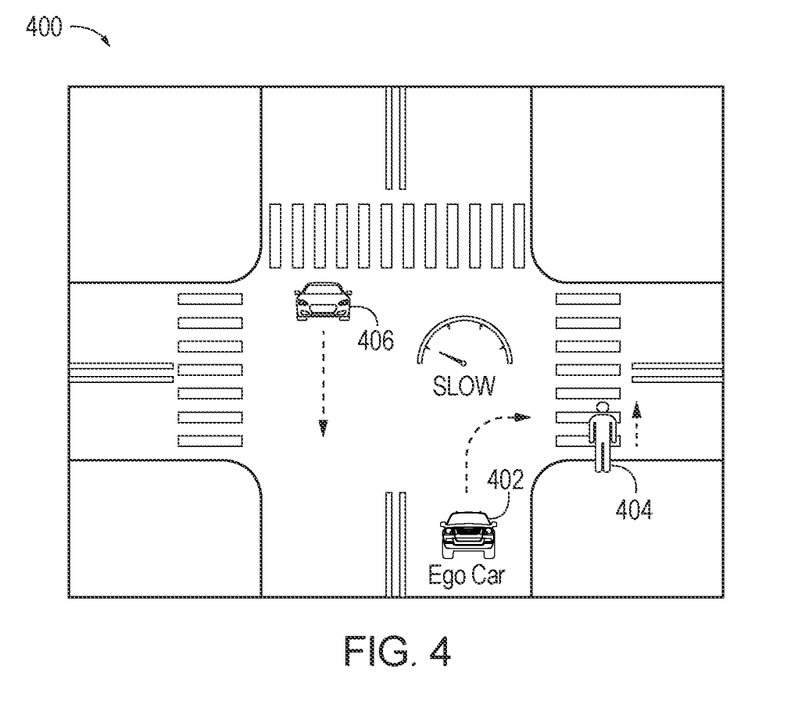
FIG. 4 is an exemplary diagram of external stimuli associated with driver behavior risk assessment and pedestrian awareness, according to one aspect.

FIG. 4 is an exemplary diagram 400 of external stimuli associated with driver behavior risk assessment and pedestrian awareness, according to one aspect. Pedestrian attentiveness may play a significant role in the perception of risk because it involves the mutual communication and intention understanding between drivers and road users or pedestrians, which may be utilized to model their respective interactions. As shown in FIG. 4, the joint attention between the ego-driver 402 and pedestrian 404 waiting to cross (i.e., pedestrian intention) forms a non-verbal communication channel which mitigates uncertainty and promotes mutual awareness between the driver and pedestrian.

The system 100 or 200 may divide the high-level modeling of decision making into specific components in order to solve tasks, associated with traffic scenarios, such as the traffic scenario of FIG. 4. In the context of driving scene, when the driver 402 needs to make a decision to either alter from current course due to a traffic agent 406, there may be a specific order of events which the driver takes into account. As shown in FIG. 4, when a driver approaches an intersection, there are often multiple paths the driver may take. Based on the driver intention, the immediate destination may be first fixed, which in this case is to turn right. Then, when the intended path is decided, the second step may be to ascertain whether there is traffic agent or situation on the intended path that might cause the driver to alter the current driving behavior. Assuming the driver intends to turn right, the vehicle crossing on the left becomes irrelevant. Finally, if there indeed is such an agent, then the driver decision is affected. As illustrated in FIG. 4, the pedestrian that is about to cross is directly in the future path of the ego-vehicle. Thus, the expected response from the driver is to proceed slowly and yield to the pedestrian.

With respect to the system 100 of FIG. 1 or the system 200 of FIG. 2, in order to model the above relationship, the system 100 or 200 may first incorporate a network to predict the driver intention. The feature representation learned through this network may then be concatenated with the graph based representation of the scene, followed by a classifier, to predict the situation influencing the driver. To predict the driver's response (e.g., influenced or non-influenced), the indication of the presence of a situation is enough, as no matter whether the situation is jaywalking or stop sign, the driver would alter from current course. Therefore, the system 100 or 200 may modify the logits of the scenario classifier in a binary manner (e.g., situation or background) to indicate the presence of an obstacle or an object. These logits may then be passed through a multilayer perceptron (MLP) and concatenated with the graph representation to predict the driver decision. The system 100 or 200 may use the same graph representation for both situation and driver decision to capture the essence that the same node in the graph (e.g., traffic agent) is responsible for both these tasks. The system 100 or 200 may optimize the network using the following multi-task loss function:

$$\mathcal{L}_{roi} = \lambda_1 \mathcal{L}_i + \lambda_2 \mathcal{L}_s + \lambda_3 \mathcal{L}_d \quad (1)$$

where $\mathcal{L}_i$, $\mathcal{L}_s$, $\mathcal{L}_d$ are losses corresponding to driver intention, situation, and driver decision, respectively, and $\lambda_1$, $\lambda_2$, $\lambda_3$ are loss balancing parameters.

With regard to pedestrian attentiveness, the annotated dataset may provide a bounding box around both the faces and body of pedestrians and the system 100 or 200 may use these annotations to train one or more of the ROI 120, the intention estimator 130, the scene representation generator 140, the situation predictor 150, or the driver response determiner 160 from a classification perspective and a detection perspective.

With regard to the classification, the system 100 or 200 may train cropped images of pedestrians and their faces separately (e.g., with minor occlusions up to a threshold amount) on a model (e.g., ResNet-101 model) and thus demonstrate the advantage of face annotations through the aforementioned annotated dataset.

With regard to the detection, the system 100 or 200 may modify a face detector by adding a separate head for estimating pedestrian attention in parallel with existing box classification and regression branches. The system 100 or 200 may detect a face in the scene and classify the face. More specifically, for any training anchor i, the system 100 or 200 may minimize the following multi-task loss function:

$$\mathcal{L}_p = \mathcal{L}_{cls}(p_i, p_i^*) + \mathcal{L}_{box}(t_i, t_i^*) + \alpha \mathcal{L}_{attn}(\alpha_i, \alpha_i^*) \qquad (2)$$

where $\mathcal{L}_{cls}$ and $\mathcal{L}_{box}$ are face classification and box regression losses similar to, $\mathcal{L}_{attn}$ is the loss for the attention head and a is used to balance an attention loss. The system 100 or 200 may use a cross entropy loss for $\mathcal{L}_{attn}$ where $\alpha_i$ the predicted probability of anchor i corresponding to looking, and is non-zero if anchor i is a positive anchor, i.e., has an overlap with the ground truth face box above a threshold γ. Correspondingly, $\alpha_i^*$ is 1 when the label is Looking and 0 if $\alpha_i^*$ is Not Looking. In this way, the system 100 or 200 may use a cropped portion to classify whether a pedestrian is looking or not looking at the ego-vehicle.

Although in driver behavior risk assessment and pedestrian awareness the system 100 or 200 may focus on instantaneous pedestrian attention, the labels may be modified to extend the pedestrian attention problem over time by converting the task to action start detection where the goal is to identify the starting point of an action.

Figure 5:
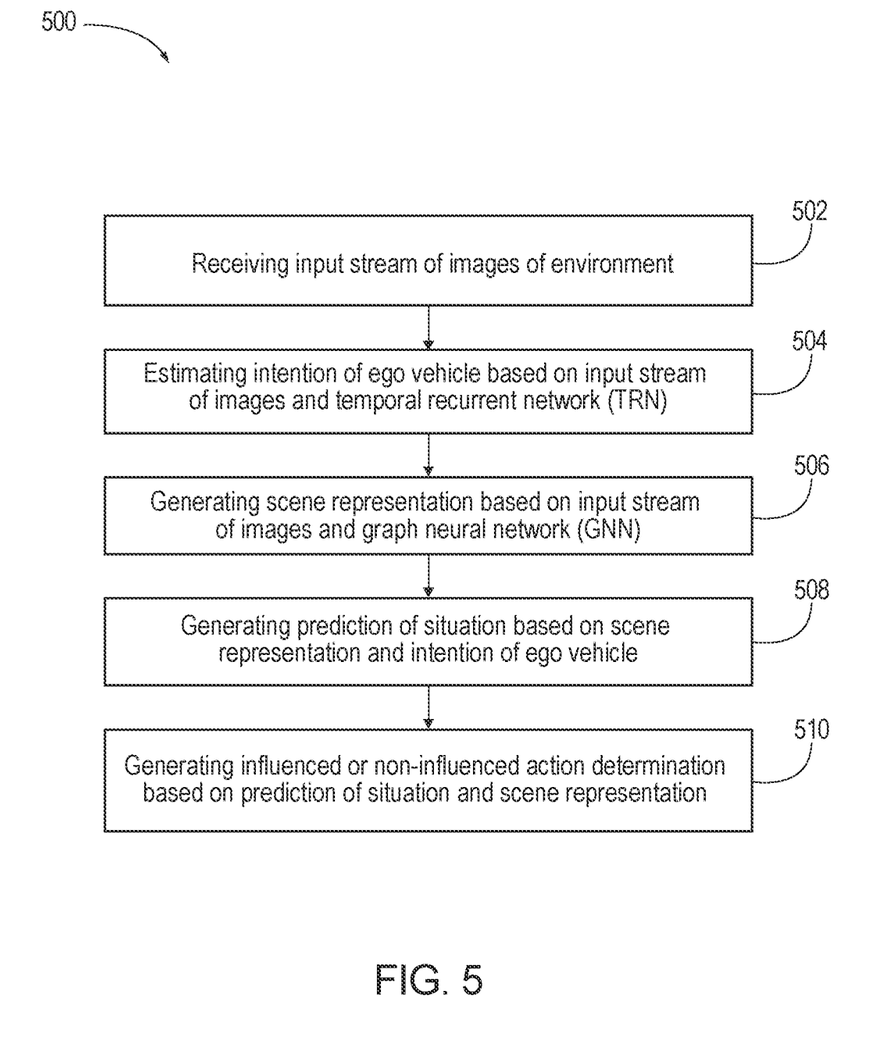
FIG. 5 is an exemplary flow diagram of a method for driver behavior risk assessment and pedestrian awareness, according to one aspect.

FIG. 5 is an exemplary flow diagram of a method 500 for driver behavior risk assessment and pedestrian awareness, according to one aspect. The method for driver behavior risk assessment and pedestrian awareness may include receiving 502 an input stream of images of an environment (e.g., a straight topology, a three-way intersection topology, or a four-way intersection topology) including one or more objects within the environment, estimating 504 an intention of an ego vehicle (e.g., a left-turn intention, a right-turn intention, or a straight-travel intention) based on the input stream of images and a temporal recurrent network (TRN), generating 506 a scene representation based on the input stream of images and a graph neural network (GNN), generating 508 a prediction of a situation (e.g., a stop sign, a traffic light, a crossing pedestrian, a crossing vehicle, a vehicle blocking ego lane, a congestion, a jaywalking, a vehicle backing into parking space, a vehicle on shoulder open door, or a cut-in) based on the scene representation and the intention of the ego vehicle, and generating 510 an influenced or non-influenced action determination based on the prediction of the situation and the scene representation.

The method 500 for driver behavior risk assessment and pedestrian awareness may include extracting image-level and object-level features from the input stream of images of the environment, determining one or more object bounding boxes for one or more of the objects within the environment, determining whether a pedestrian is looking or not looking at the ego vehicle, and one or more of the object bounding boxes may be around a face or a head of the pedestrian, generating the prediction of the situation based on an element-wise dot product of the scene representation and the intention of the ego vehicle, and generating the influenced or non-influenced action determination based on passing the prediction of the situation through a multilayer perceptron (MLP) and the scene representation.

Figure 6:
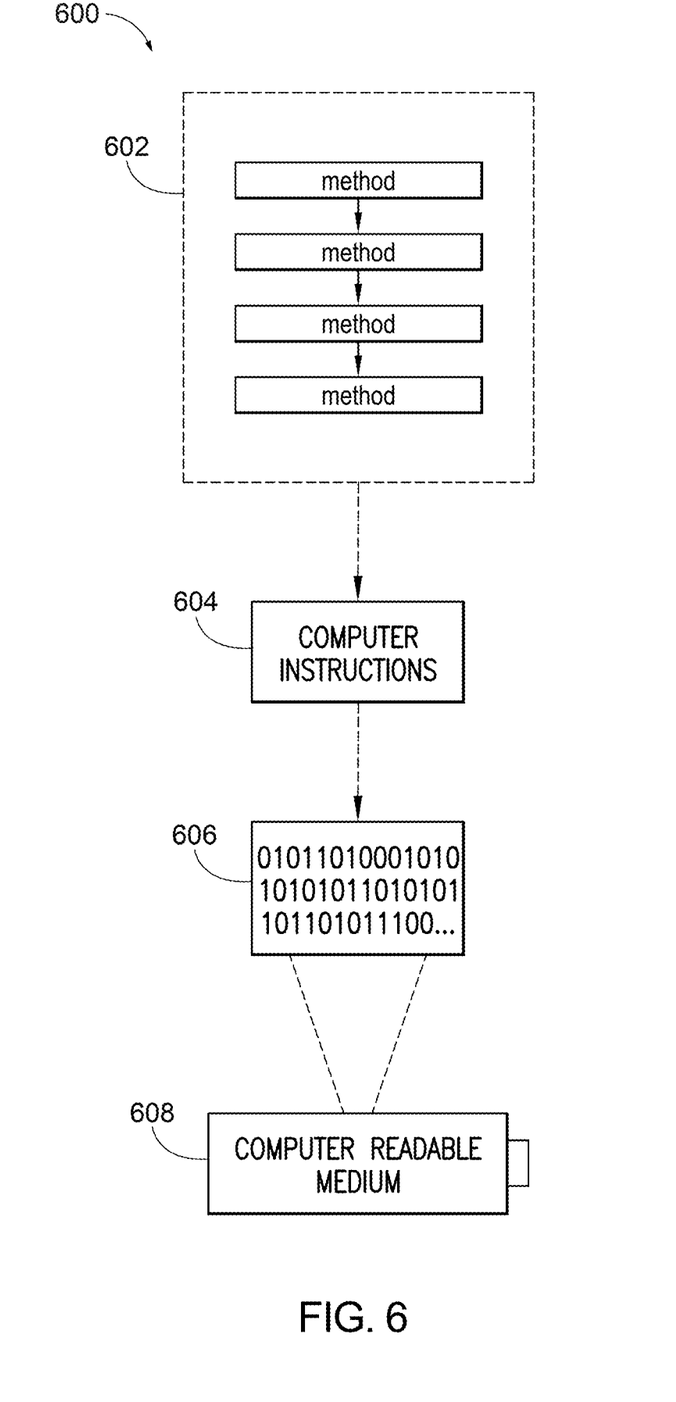
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 500 of FIG. 5. In another aspect, the processor-executable computer instructions 604 may be configured to implement a system, such as the system 100 of FIG. 1 or the system 200 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
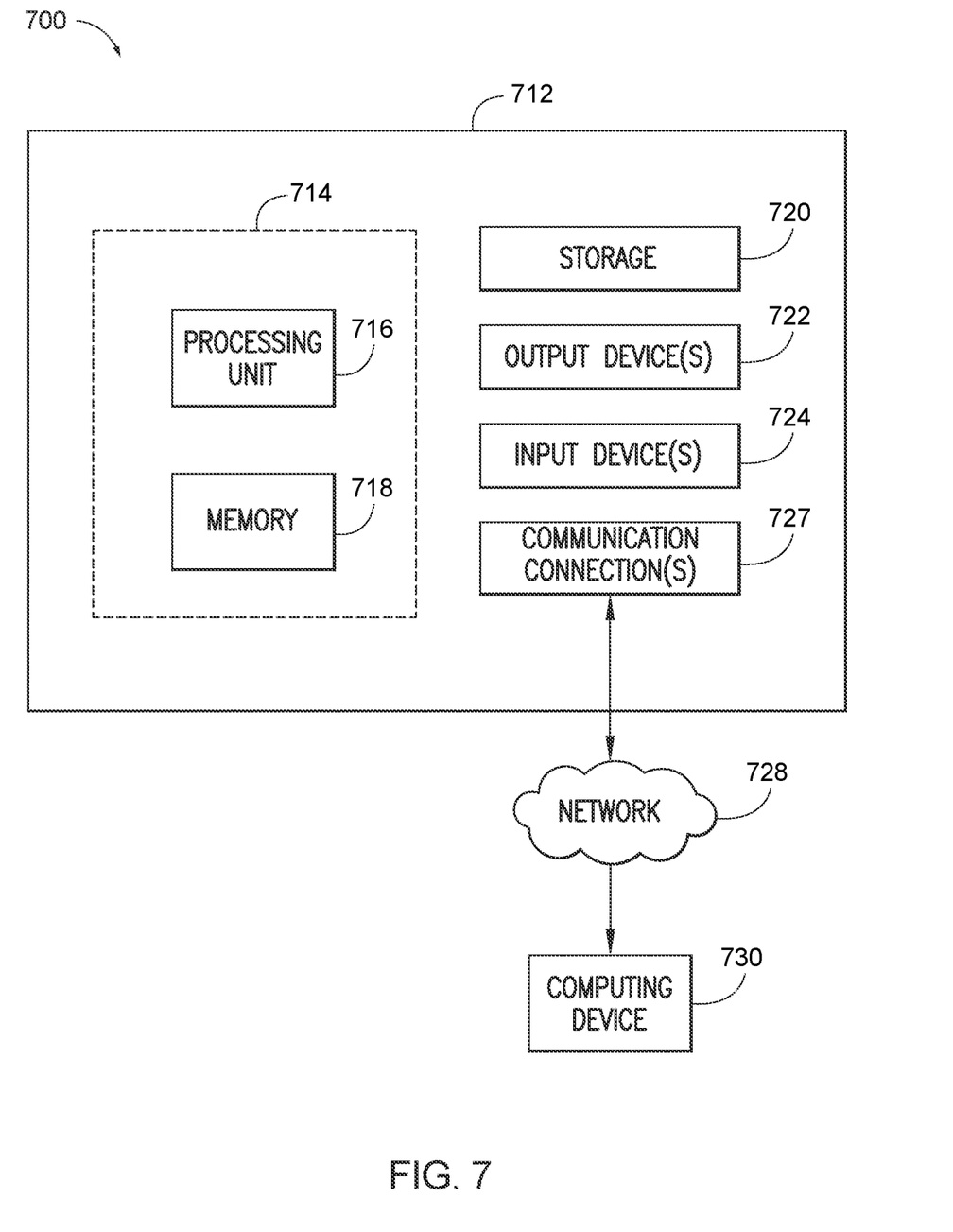
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for driver behavior risk assessment and pedestrian awareness, comprising:
    an image sensor receiving an input stream of images of an environment including one or more objects within the environment;
    an intention estimator estimating an intention of an ego vehicle based on the input stream of images and a temporal recurrent network (TRN);
    a scene representation generator generating a scene representation based on the input stream of images and a graph neural network (GNN);
    a situation predictor generating a prediction of a situation based on an element-wise dot product of the scene representation and the intention of the ego vehicle; and
    a driver response determiner generating an influenced or non-influenced action determination based on the prediction of the situation and the scene representation.

2. The system for driver behavior risk assessment and pedestrian awareness of claim 1, wherein the intention of the ego vehicle is estimated as a left-turn intention, a right-turn intention, or a straight-travel intention.

3. The system for driver behavior risk assessment and pedestrian awareness of claim 1, wherein the environment includes a straight topology, a three-way intersection topology, or a four-way intersection topology.

4. The system for driver behavior risk assessment and pedestrian awareness of claim 1, wherein the situation includes a stop sign, a traffic light, a crossing pedestrian, a crossing vehicle, a vehicle blocking ego lane, a congestion, a jaywalking, a vehicle backing into parking space, a vehicle on shoulder open door, or a cut-in.

5. The system for driver behavior risk assessment and pedestrian awareness of claim 1, comprising a risk object identifier (ROI) extracting image-level and object-level features from the input stream of images of the environment.

6. The system for driver behavior risk assessment and pedestrian awareness of claim 5, wherein the ROI determines one or more object bounding boxes for one or more of the objects within the environment.

7. The system for driver behavior risk assessment and pedestrian awareness of claim 6, wherein one or more of the object bounding boxes are around a face or a head of a pedestrian and the ROI determines whether the pedestrian is looking or is not looking at the ego vehicle.

8. The system for driver behavior risk assessment and pedestrian awareness of claim 1, wherein the driver response determiner generates the influenced or non-influenced action determination based on passing the prediction of the situation through a multilayer perceptron (MLP) and the scene representation.

9. The system for driver behavior risk assessment and pedestrian awareness of claim 1, wherein the situation predictor classifies the prediction of the situation into a binary class.

10. A method for driver behavior risk assessment and pedestrian awareness, comprising:
- receiving an input stream of images of an environment including one or more objects within the environment;
- estimating an intention of an ego vehicle based on the input stream of images and a temporal recurrent network (TRN);
- generating a scene representation based on the input stream of images and a graph neural network (GNN);
- generating a prediction of a situation based on an element-wise dot product of the scene representation and the intention of the ego vehicle; and
- generating an influenced or non-influenced action determination based on the prediction of the situation and the scene representation.

11. The method for driver behavior risk assessment and pedestrian awareness of claim 10, wherein the intention of the ego vehicle is estimated as a left-turn intention, a right-turn intention, or a straight-travel intention.

12. The method for driver behavior risk assessment and pedestrian awareness of claim 10, wherein the environment includes a straight topology, a three-way intersection topology, or a four-way intersection topology.

13. The method for driver behavior risk assessment and pedestrian awareness of claim 10, wherein the situation includes a stop sign, a traffic light, a crossing pedestrian, a crossing vehicle, a vehicle blocking ego lane, a congestion, a jaywalking, a vehicle backing into parking space, a vehicle on shoulder open door, or a cut-in.

14. The method for driver behavior risk assessment and pedestrian awareness of claim 10, comprising extracting image-level and object-level features from the input stream of images of the environment.

15. The method for driver behavior risk assessment and pedestrian awareness of claim 14, comprising determining one or more object bounding boxes for one or more of the objects within the environment.

16. The method for driver behavior risk assessment and pedestrian awareness of claim 15, comprising determining whether a pedestrian is looking or is not looking at the ego vehicle, wherein one or more of the object bounding boxes are around a face or a head of the pedestrian.

17. The method for driver behavior risk assessment and pedestrian awareness of claim 10, comprising generating the influenced or non-influenced action determination based on passing the prediction of the situation through a multilayer perceptron (MLP) and the scene representation.

18. A driver behavior risk assessment and pedestrian awareness vehicle, comprising:
- an image sensor receiving an input stream of images of an environment including one or more objects within the environment;
- an intention estimator estimating an intention of the vehicle based on the input stream of images and a temporal recurrent network (TRN);
- a scene representation generator generating a scene representation based on the input stream of images and a graph neural network (GNN);
- a situation predictor generating a prediction of a situation based on an element-wise dot product of the scene representation and the intention of the vehicle; and
- a driver response determiner generating an influenced or non-influenced action determination based on the prediction of the situation and the scene representation.

* * * * *